United States Patent
Rougeot et al.

(10) Patent No.: US 7,707,886 B2
(45) Date of Patent: May 4, 2010

(54) MICRO-MACHINED GYROMETRIC SENSOR FOR DIFFERENTIAL MEASUREMENT OF THE MOVEMENT OF VIBRATING MASSES

(75) Inventors: Claude Rougeot, Lyons (FR); Bernard Chaumet, Chatellerault (FR); Bertrand Le Verrier, Montelier (FR); Jerome Willemin, Tullins (FR)

(73) Assignee: Thales (FR)

( * ) Notice: Subject to any disclaimer, the term of this patent is extended or adjusted under 35 U.S.C. 154(b) by 284 days.

(21) Appl. No.: 11/994,825

(22) PCT Filed: Jun. 19, 2006

(86) PCT No.: PCT/EP2006/063306

§ 371 (c)(1),
(2), (4) Date: Jan. 4, 2008

(87) PCT Pub. No.: WO2007/003501

PCT Pub. Date: Jan. 11, 2007

(65) Prior Publication Data

US 2008/0210005 A1    Sep. 4, 2008

(30) Foreign Application Priority Data

Jul. 5, 2005   (FR) .................................. 05 07144

(51) Int. Cl.
*G01C 19/56*   (2006.01)
*G01P 9/00*    (2006.01)

(52) U.S. Cl. ................................. 73/504.12; 73/504.14
(58) Field of Classification Search .............. 73/504.12, 73/504.14, 504.04, 504.15, 504.16, 504.02
See application file for complete search history.

(56) References Cited

U.S. PATENT DOCUMENTS 7,051,591 B2 *  5/2006  Chaumet et al. ......... 73/504.12
7,159,460 B2 *  1/2007  Nicu et al. ............... 73/504.12

FOREIGN PATENT DOCUMENTS

| EP | 1519149 | 3/2005 |
| FR | 2859527 | 3/2005 |
| WO | 2004042324 | 5/2004 |
| WO | 2005031257 | 4/2005 |

* cited by examiner

*Primary Examiner*—Helen C. Kwok
(74) *Attorney, Agent, or Firm*—Lowe Hauptman Ham & Berner, LLP

(57) ABSTRACT

The invention relates to a microgyroscope, that is to say an inertial micromechanical sensor dedicated to the measurement of angular velocities, which is produced by micromachining techniques, and has a novel arrangement of the modules for measuring the movement of the vibrating masses. The gyroscope comprises two symmetrical moving assemblies (30, 50; 30', 50') that are coupled by a coupling structure (20, 20', 22). Each of the two assemblies comprises a moving mass (30) surrounded by a moving intermediate frame (50). The frame (50) is connected to the coupling structure (20, 20', 22) and can vibrate in two degrees of freedom in orthogonal directions Ox and Oy of the plane of the wafer. The mass (30) is connected, on one side, to the frame and, on the other side, to fixed anchoring regions (34, 36) via linking means (40-46; 52-58) that allow the vibration movement in the Oy direction to be transmitted to the mass without permitting any movement of the mass in the Ox direction. An excitation structure (70) is associated with the frame in order to excite its vibration along Ox. A movement detection structure (90) is associated with the mass (30) in order to detect its vibration along Oy.

17 Claims, 1 Drawing Sheet

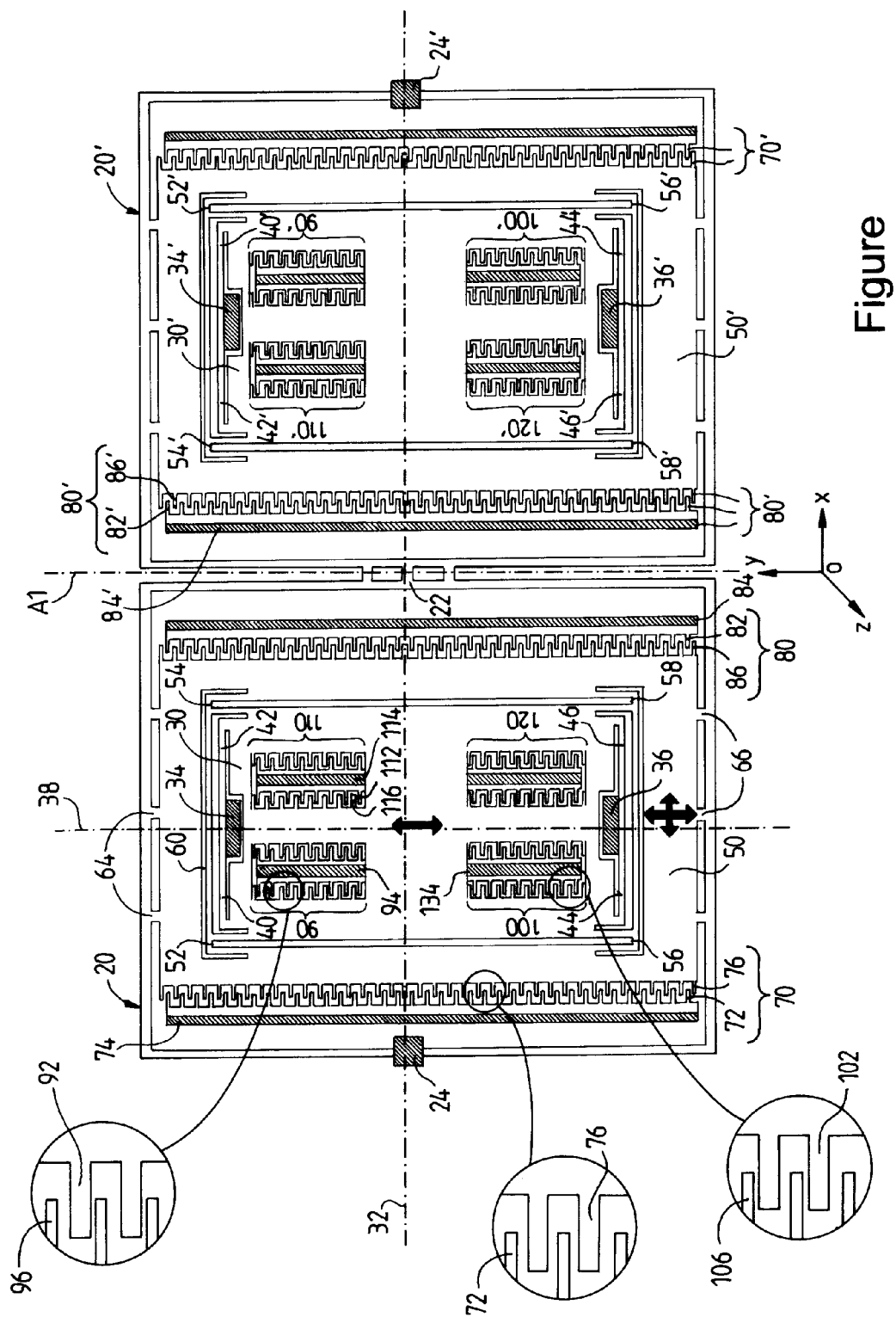
Figure

MICRO-MACHINED GYROMETRIC SENSOR FOR DIFFERENTIAL MEASUREMENT OF THE MOVEMENT OF VIBRATING MASSES

CROSS REFERENCE TO RELATED APPLICATIONS

The present Application is based on International Application No. PCT/EP2006/063306 filed on Jun. 19, 2006, which in turn corresponds to French Application No. 05 07144 filed on Jul. 5, 2005, and priority is hereby claimed under 35 USC §119 based on these applications. Each of these applications are hereby incorporated by reference in their entirety into the present application.

The invention relates to a microgyroscope, that is to say an inertial micromechanical sensor dedicated to the measurement of angular velocities, which is produced by micromachining techniques and has a novel arrangement of the modules for measuring the movement of the vibrating masses.

BACKGROUND OF THE INVENTION

The inspiration for micromachining sensors comes from techniques for producing integrated circuits. This consists in producing, collectively on a single thin wafer (in principle a silicon wafer), several tens or hundreds of identical sensors using deposition, doping and photoetching techniques that define not only the electrical parts of the sensor but also the cut-out geometrical features that give the sensor its mechanical properties.

The etching techniques are well controlled and collective fabrication considerably reduces the costs. The robustness of the devices is excellent and the small size of the structures is highly advantageous.

To produce a microgyroscope, a suspended vibrating mass is formed in a silicon wafer together with an electrical excitation structure for making this mass vibrate in a defined direction. When the gyroscope rotates about an axis called the sensitive axis of the gyroscope, perpendicular to this vibration direction, a Coriolis force is exerted on the mass. This Coriolis force, which is a vector sum of the vibration movement and the rotation movement, produces a vibration of the mass in a direction perpendicular both to the excitation vibration and to the axis of rotation. This resulting natural vibration is detected by a detection structure, which is itself produced by micromachining. Structures having two vibrating masses that are mechanically coupled in the manner of a tuning fork have already been produced. The two masses are coplanar and machined in the same silicon wafer.

In general, the sensitive axis of these gyroscopes lies in the plane of the silicon wafer and the detection structure detects any movement perpendicular to the plane of the masses using electrodes placed above each moving mass. The electrical signals resulting from this detection are used to determine an angular velocity of rotation of the gyroscope about its sensitive axis.

However, to produce structures for detecting movements perpendicular to the plane of the moving masses generally requires the gyroscope to comprise several machined wafers, which have to be joined together. One of the wafers includes the actual micromachined vibrating structure with its moving masses, its linking arms and a vibration excitation structure, while at least one other wafer includes electrodes for detecting the vibration generated by the Coriolis force. To fabricate the multi-wafer assembly is expensive.

This is why there is also a need to produce technologically simpler structures, machined in a single silicon wafer, in which an excitation movement of the moving mass is generated in a direction Ox in the plane, whereas a movement resulting from the Coriolis force is detected in a direction Oy in the same plane, perpendicular to Ox. The sensitive axis of the microgyroscope is in this case an Oz axis perpendicular to the plane of the silicon wafer. The excitation structure and the detection structure are interdigitated capacitive combs produced when machining the silicon wafer. All the electrical structures are produced on the same wafer as the vibrating mechanical structure. Fabrication is therefore much less expensive.

In this type of gyroscope it is necessary for the excitation movement along the Ox axis to be well separated from the detection movement along the Oy axis—specifically, this means that the detection structure must detect mainly the movement along Oy that results from the Coriolis force, without the measurement being contaminated by parasitic detection of the excitation movement along Ox.

In the case of a gyroscope of the prior art comprising two vibrating masses and detecting in the plane of their movement, a differential effect is employed to overcome non-linearities and to achieve a high sensitivity. This differential effect consists of subtraction of the signals generated by the movement of the masses, the masses vibrating along the same axis but in phase opposition. When the two masses do not have a perfectly identical static capacitance, the difference in capacitance of the two masses is the cause of a drift of the gyroscope, which impairs its proper operation. Moreover, the gyroscopes of the prior art comprise a detection module for measuring the movement of each mass. These detection modules deliver a signal that changes in the same sense, although the movements of the two masses are the reverse of each other, thereby making the gyroscope sensitive to an acceleration, whether dynamic or static, collinear with the axis of movement of the masses.

OBJECTS AND SUMMARY OF THE INVENTION

One object of the invention is to propose a microgyroscope structure that allows rotation measurement with a very high sensitivity, very good linearity and very good bias stability, but with minimal perturbations due to the excitation movement or to the static or dynamic acceleration applied in the axis collinear with the axis of displacement of the masses. Another object is to propose a microgyroscope structure that can accommodate, apart from the electrical structures for inducing vibration and for detecting movement, auxiliary electrical structures for adjusting the frequency, for compensating for any bias (an angular velocity measurement not equal to zero when the angular velocity is equal to zero) due to intrinsic defects or to the spread in characteristics resulting from mass production and for slaving the position of the masses on a fixed position which may be that which it occupies when the masses are at rest.

According to the invention, what is proposed is a gyroscope with a vibrating structure, produced by micromachining a thin planar wafer, this gyroscope comprising two symmetrical moving assemblies (30, 50; 30', 50') that are symmetrical with respect to a central axis parallel to a direction Oy of the plane of the wafer and are coupled by a coupling structure (20, 20', 22) that connects these two assemblies in order to allow mechanical vibration energy to be transferred between them, each of the two symmetrical moving assemblies comprises two moving elements (30, 50), an inertial first moving element (50) being connected to the coupling structure (20, 20', 22) and able to vibrate in two degrees of freedom in orthogonal directions Ox and Oy of the plane of the wafer, and a second moving element (30) being connected, on one side, to the first element (50) and, on the other side, to fixed anchoring regions (34, 36) via linking means (40-46; 52-58) that allow the vibration movement of the first element in the Oy direction to be transmitted to the second element without permitting any movement of the second element in the Ox direction, an excitation structure (70) being associated with the first moving element (50) in order to excite a vibration of the first element along Ox, and first and second movement detection structures (90, 110; 100, 120) being associated with the second moving element (30) of each of the two assemblies in order to detect a vibration of the second elements along Oy, the first moving element (50) being a rectangular intermediate frame surrounding the second moving element, denoted by the name moving mass (30), and the coupling structure comprising two outer frames (20, 20'), each of which surrounds the intermediate frame of a respective moving assembly, characterized in that each detection structure comprises a first detection module (90, 110; 90', 110') and a second detection module (100, 120; 100', 120') which are symmetrical with respect to the general axis of symmetry Ox, the first detection modules (90, 110; 90', 110') of each structure on the one hand and the second detection modules (100, 120; 100', 120') of each structure on the other hand being symmetrical with respect to the central axis parallel to the Oy direction, the first and second modules of each structure delivering separate detection signals that vary inversely with respect to one another, these being first and second signals S1M1, S1M2 in the case of the first and second modules of the first structure and third and fourth signals S2M1, S2M2 in the case of the first and second modules of the second structure, and means being provided for producing the linear combination S1M1+S2M2−S1M2−S2M1.

BRIEF DESCRIPTION OF THE DRAWING

Other features and advantages of the invention will become apparent on reading the detailed description that follows, which is given with reference to the appended drawings in which:

the single FIGURE shows a top view of the general structure of the micromachined gyroscope according to the invention.

MORE DETAILED DESCRIPTION

The FIGURE shows the thin flat silicon wafer machined according to the invention in order to make a gyroscope whose sensitive axis is perpendicular to the plane of the wafer (which is the plane of the FIGURE).

Silicon is chosen as preferred material, firstly for its mechanical properties and secondly for its high conductivity when it is doped sufficiently with an appropriate impurity (boron in general in the case of p-type silicon). Conductive silicon allows the electrical functions of the gyroscope, and especially the excitation and detection functions, to be carried out. These functions are carried out by interdigitated capacitive combs supplied with electrical current or voltage. The fingers of these combs, machined directly in the conductive silicon, serve as the plates of capacitors useful for the excitation and detection functions.

The thickness of the starting silicon wafer is a few hundred microns. The wafer has, on the one hand, fixed anchoring regions formed in this thickness and, on the other hand, the actual vibrating structure, which is free relative to the anchoring regions and is formed over a smaller thickness, for example over a thickness of a few tens of microns, and is isolated from the rest of the thickness of the wafer by a narrow gap. The silicon wafer is cut by micromachining, over this thickness of a few tens of microns, into the features, namely the moving mass, the moving frame, the coupling structure, the flexure arms and the interdigitated combs, that are desired.

The structure may be machined using, as starting substrate, a silicon-on-insulator substrate, but other methods are also possible. A silicon-on-insulator substrate consists of a silicon substrate a few hundred microns in thickness that carries, on its front face, a thin layer of silicon oxide which is itself covered with a layer of single-crystal silicon a few tens of microns in thickness. The machining operation consists in etching the silicon of the substrate via its front face, into the desired surface features, by means of photoetching techniques commonly used in microelectronics, down to the oxide layer, with a selective etchant that etches the silicon without significantly etching the oxide. The etching is stopped when the oxide layer is bared. This oxide layer is then removed by selective etching using another etchant so as to leave only the surface layer of single-crystal silicon, except in the anchoring regions where the oxide layer remains and forms a strong bond between the substrate and the surface layer of single-crystal silicon. Machining via the front face defines the various cutting operations for the moving parts. These are therefore the above surface features, anchoring regions and cutting operations for the moving parts, as will be seen in the FIGURE.

The general structure of the gyroscope is a structure of the tuning fork type, that is to say a symmetrical structure comprising two moving inertial assemblies vibrating in phase opposition, these moving assemblies being connected together via a coupling structure serving to transmit, without any loss, from one assembly to the other, the mechanical vibration energies of the two assemblies in order to render these vibrations in phase opposition. The symmetry of the structure is a symmetry with respect to an axis A1, with one moving assembly on each side of this axis.

The coupling structure is preferably formed by two rectangular outer frames 20 and 20' within which the moving inertial assemblies are located. The frames 20 and 20' are connected together via a short linking bar 22, which may be regarded as being rigid. The linking bar 22 links the middle of one side of the first frame to the middle of an adjacent side of the second frame. It constitutes a center of symmetry of the entire structure and it is perpendicular to the axis A1 and centered on this axis. The short linking bar 22 may be reinforced by two other short linking bars located on either side of the bar 22 and also centered on the axis A1. These short bars, of greater or lesser distance from the bar 22, allow the difference between the useful excitation and detection frequencies of the microgyroscope to be adjusted (the detection frequency preferably being slightly different from the excitation frequency, and the frequency difference representing the bandwidth of the gyroscope).

The outer frames 20 and 20' of the coupling structure surround the two moving assemblies, in principle over at least three sides, and they are connected to these two assemblies preferably along sides perpendicular to the general axis of symmetry A1. The frames 20 and 20' may (optionally) each be attached to an anchoring region 24, 24' located in the middle of one side opposite the side connected to the linking bar 22. In this case, the frames 20 and 20' each completely surround a respective inertial moving assembly. The central linking bar 22 and the other sides of the frames 20 and 20' are not connected to fixed anchoring regions.

The interdigitated combs serving to make the inertial assemblies vibrate and to detect the movement resulting from the Coriolis force are also placed inside each of the outer frames 20 and 20'. In what follows, only the elements located inside the frame 20 will be described, the structure for the other frame 20' being strictly identical. The elements internal to the frame 20' are denoted by the same references as those of the frame 20, but with the addition of the "prime" suffix.

Each inertial assembly comprises a central moving inertial mass 30 and an intermediate inertial frame 50 that surrounds it and that is therefore located between the mass 30 and the outer frame 20.

The moving mass 30 can move only in the Oy direction (vertical axis in the plane of the FIGURE). The intermediate frame 50 can move along the Oy axis and along the Ox axis perpendicular to Oy and also lying in the plane of the FIGURE. The sensitive axis of the gyroscope is the Oz axis perpendicular to the plane of the wafer. A vibration of the inertial intermediate frame is excited in the Ox direction. When the gyroscope rotates about its sensitive axis Oz, the intermediate frame is made to vibrate along the Oy axis. This vibration along Oy is transmitted to the mass 30, whereas the vibration along Ox is not transmitted. As will be seen, a vibration excitation structure is associated with the intermediate frame 50 and a vibration detection structure is associated with the inertial mass 30. The coupling structure, formed by the frames 20, 20' and the bar 22 which connects them, transmits the mechanical vibration energy from the moving inertial assembly on one side of the axis A1 to the other, both for vibrations along Ox and vibrations along Oy as this coupling structure is connected directly to the intermediate frames that may vibrate both along Ox and along Oy.

The moving mass 30 is connected to fixed anchoring regions via at least two flexure arms designed to permit the mass to move along Oy but to prevent any significant movement of the mass in the Ox direction. These arms are preferably located on either side of an axis of symmetry 32 of the mass, parallel to Ox. There are therefore two anchoring regions 34 and 36 located on either side of the moving mass, these being symmetrical with respect to this axis of symmetry 32. In addition, these regions are preferably located on another axis of symmetry 38 of the mass, which axis is parallel to Oy. The flexure arms that connect the mass 30 to the regions 34 and 36 are arms elongated in the Ox direction so as to have a high stiffness (a high resistance to elongation) in that direction. They are also very narrow, compared to their length, so as to have a low stiffness in the Oy direction perpendicular to Ox. This low stiffness allows the mass to move along Oy. There are preferably four flexure arms rather than two, the mass being connected to the anchoring region 34 via two arms 40 and 42 in line with each other and on either side of the region 34. The mass is also connected to the second anchoring region 36 via two arms 44 and 46 in line with each other and on either side of the region 36.

In practice, as may be seen in the FIGURE, to save space in the Oy direction without significantly reducing the length of the mass in that direction, a cut is made in the mass around the anchoring region. To maximize the flexibility of the flexure arms in the Oy direction by increasing the ratio of the length to the width of these arms, each arm is connected on one side to a point near an end corner of the mass (the mass has, in principle, a generally rectangular shape) and on the other side to the anchoring region located on the axis of symmetry 38. It should be noted that it would also be possible to envisage giving the arms 40, 42, 44, 46 a folded-over shape with two branches elongated in the Oy direction, the arms then being attached to the mass closest to the central anchoring region.

It should also be noted that, rather than one central anchoring region located in the middle of one side of the moving mass, there could be two anchoring regions located more toward the end corners of the mass on either side of the axis 38.

The moving intermediate frame 50 preferably completely surrounds the mass 30. The mass 30 is connected to the intermediate frame 50 via at least two flexure arms that have the particular feature of having a very high stiffness (very high resistance to elongation) in the Oy direction and a low stiffness in the Ox direction. These arms are elongated in the Oy direction and have a small width compared to their length, so as to exhibit this stiffness difference.

There are preferably four flexure arms of this type between the mass 30 and the intermediate frame 50, the arms being each located in practice at a corner of the moving mass if the latter is of generally rectangular shape. They are placed symmetrically on one side of the axis of symmetry 32 of the mass (the axis parallel to Ox) and on the other side of the axis of symmetry 38 (parallel to Oy).

These arms are denoted by the references 52, 54, 56 and 58 and they preferably have a shape folded over in the form of a U in order to reduce their longitudinal dimension by a factor of two without significantly reducing their useful length, and therefore without significantly reducing the high ratio of their stiffness along Oy to their stiffness along Ox. The two U-shaped folded-over branches are elongated parallel to Oy and are connected together via a short linking element. However, it would be possible for the arms 52 to 58 not to be folded over but to lie completely along the Oy direction between the intermediate frame and the mass. By folding them over it is possible to save space without significantly modifying the desired mechanical characteristics.

If the arms are folded over as in the FIGURE, it is preferable for the short linking element (which connects the two branches of the U) of a first arm 52 to also be connected to the corresponding short element of the arm 54 which is symmetrical with the arm 52 with respect to the axis 38. A crosspiece 60 is provided for this purpose, parallel to Ox, in order to connect the bottom of the U of the linking arm 52 to the bottom of the U of the flexure arm 54, the arms 52 and 54 being symmetrical with respect to the axis 38. A similar crosspiece 62, symmetrical with the crosspiece 60 with respect to the axis 32, connects the symmetrical elements 56 and 58. These crosspieces 60 and 62, parallel to Ox, reinforce the symmetry of transmission of movement along Oy, imposed by the moving intermediate frame 50, to the mass 30. They are not present if the arms 52, 54, 56 and 58 do not have a folded-over shape as in this case the ends of the arms 52 and 54 would already be rigidly connected via the intermediate frame 50 itself.

As may be seen in the FIGURE, the elongate U-shaped folded-over form of the flexure arms between the moving frame 50 and the moving mass 30 is obtained by cutting into the moving frame and into the moving mass, but in general the flexure arms start approximately from an internal corner of the intermediate frame toward a facing corner of the mass, even if the effective point of attachment of the arm on the frame or on the mass is not exactly from this corner. The mass may be considered as being overall suspended via its four corners to the moving frame.

The moving intermediate frame 50, surrounded by the outer frame 20 of the coupling structure, is connected to this outer frame via short linking arms 64 on one side and short linking arms 66 on the other, the arms 64 being symmetrical to the arms 66 with respect to the axis of symmetry 32. The arms 64, like the arms 66, are distributed along one side of the frame 50, this side being parallel to the Ox axis. These short arms constitute practically rigid links through which the energy of vibration of Ox and Oy of the intermediate frame 50 (and of the moving mass 30) can pass into the coupling structure and therefore into the second intermediate frame 50' and the second moving mass 30'. In the example shown, three short arms 64 are distributed along the side of the intermediate frame 50 and three other short arms 66 are distributed along the opposite side.

There is no linking arm between the intermediate frame and the outer coupling frame along the sides parallel to the Oy axis.

The intermediate frame 50 is excited in vibration along Ox by a first structure in the form of an interdigitated comb 70 that comprises a fixed half-comb 72 attached to an anchoring region 74, and a moving half-comb 76 formed along a first side (parallel to Oy) of the intermediate frame 50. The teeth or fingers of the fixed half-comb 72, made of conductive silicon machined at the same time as the other elements of the gyroscope, constitute the first plate of a capacitor and the teeth or fingers of the moving half-comb 76, also made of conductive silicon, constitute the second plate of this capacitor. Conventionally, the comb structure acts as an exciter, for exciting the movement of the moving portion thanks to the attractive forces that are exerted between the facing fingers when a voltage is applied between the half-combs. The excitation voltage is an AC voltage in order to generate a vibration movement, and the frequency of this voltage is chosen to be close to the mechanical resonance frequency of the structure. The excitation voltage is applied between the anchoring region 74 and one and/or the other of the anchoring regions 34 and 36. The fixed half-comb 72 is in direct electrical contact (via the conductive silicon substrate) with the anchoring region 74. The moving half-comb 76 is in contact with the anchoring regions 34 and 36 via the flexure arms 52 to 58, via the body of the moving mass, via the flexure arms 40 to 46 and via the intermediate frame 50, so that, when a voltage is applied between the anchoring region 74 and the anchoring regions 34 or 36, a voltage is applied between the fixed portion and the moving portion of the comb 70.

The excitation movement generated in the intermediate frame 50 is along the Ox direction, the combs acting by modifying the mutual area of overlap of the intercalated fingers.

The microgyroscope preferably includes another interdigitated comb structure associated with the intermediate frame, symmetrical with the structure 70 with respect to the axis 38. It comprises a fixed half-comb 82, attached to an anchoring region 84, and a moving half-comb 86 machined along one side of the intermediate frame 50. This structure may serve as a detector for detecting the movement of the frame along Ox. It is useful for servocontrol of the movement excited by the comb 70. In general, servocontrol is useful for adjusting the excitation frequency with respect to the resonant frequency of the structure. The voltages detected by the structure 80 appear between the anchoring region 84 and the anchoring regions 34 and 36 (or else the region 24).

A double movement detection structure comprising first and second elementary detection structures is associated with the second moving element (30) of each of the two assemblies in order to detect a vibration of the second elements along Oy. Each elementary detection structure comprises a first detection module and a second detection module.

These detection modules are symmetrical with respect to the axis of symmetry 32 of the mass and they each comprise two identical interdigitated combs 90, 110. The orientation of these combs depends on the principle on which the detection is based. If the detection is based on a measurement of the changes in mutual overlap area between the fingers of the fixed and moving half-combs, the comb for detecting the movements along Oy is placed perpendicular to the excitation comb 70 (which also is based on changes in overlap area). If the detection is however based on measuring the changes in spacing between the fingers of the fixed half-comb and the moving half-comb, the detection comb is placed parallel to the excitation comb. Detection by the change in spacing between fingers is preferred as it is more sensitive. The interdigitation of the combs is then asymmetric at rest, the fingers of one half-comb not being exactly in the middle of the gap between two fingers of the other half-comb, whereas a comb operating (like the excitation comb) on the basis of changes in overlap area has the fingers of one half-comb in the middle of the gap between the fingers of the other half-comb.

This is the case shown in the FIGURE, in which the detection combs are placed in the same general orientation as the combs 70 and 80, although they are associated with a movement along Oy while the combs 70 and 80 are associated with a movement (excitation or detection movement) along Ox.

In the example shown in the FIGURE, the first and second modules are associated with the moving mass, each of them comprising two identical interdigitated combs. The first module comprises two combs 90 and 110 placed parallel to the axis of symmetry 38 and on either side of this axis. These combs act in the same way, by detecting the movement of the mass along Oy, but as a variant it would be possible to be limited to just a single comb placed at the center of the mass along the axis 38.

The comb 90 comprises a fixed half-comb 92 attached to an anchoring region 94 and a moving half-comb 96 forming part of the moving mass itself. The moving mass includes a cut-out to leave space for the fixed comb 92 and for the anchoring region 94, and the edges of this cut-out are cut in the form of fingers in order to constitute the moving half-comb 96 in which the fingers of the fixed half-comb are intercalated. In the example shown, the comb 90 is a double comb, that is to say two sides of the cut-out in the mass 30 are provided with fingers, and the fixed half-comb 92 has fingers on either side of the anchoring region 94.

The interdigitated structure 110 is strictly symmetrical with the structure 90 with respect to the axis of symmetry 38 and is formed in another cut-out in the moving mass 30. It comprises a fixed half-comb 112, an anchoring region 114 and a moving half-comb 116.

In order to detect the movement along Oy, an electronic circuit associated with this structure detects the frequency modulation of the electrical voltages present between the anchoring region 94 and the anchoring regions 34 and 36, and/or between the region 114 and the regions 34 and 36 constituting a first detection signal S1M1 of the first module. This modulation is due only to a movement of the moving mass along the Oy axis, since the mass can only move along this axis.

The second detection module comprises two combs 100, 120 which are symmetrical with the combs 90, 110 of the first module with respect to the axis of symmetry 32 of the mass, the detection signal S1M2 of the second module consisting of the frequency modulation of the electrical voltages present between an anchoring region 104 of the comb 100 and the anchoring regions 34.

Because of the symmetry of the first and second modules along the axis 32, when the mass 30 is at rest the relative position, along the Ox axis, of the teeth of the moving half-comb 96 relative to the teeth of the fixed comb 92 is the reverse, with respect to the relative position, along the Ox axis, of the teeth of the moving half-comb 106 relative to the teeth of the fixed comb 102. Consequently, when the mass 30 undergoes a movement along the Oy axis, the first detection signal S1M1 and a second detection signal S1M2 from the second module change inversely.

For symmetry reasons, the same applies in the case of a third detection signal S2M1 and a fourth detection signal S2M2 coming from the first and second detection modules, respectively, for detecting movement of the central moving inertial mass 30'.

The four detection signals are used in the form of a linear combination S1M1+S2M2−S1M2−S2M1, which constitutes the resulting output signal of the gyroscope.

The linear combination deals with four signals, which are generated by the movement of two masses vibrating in phase opposition, two of the signals varying inversely with the other two. The gyroscope delivering the resulting output signal is insensitive to acceleration in the direction of the movement of the masses.

On the assumption that the static capacitance difference between the first modules of the first and second structures is identical to the static capacitance difference between the second modules of the first and second structures, this static capacitance difference produces no effect on the resulting output signal, and consequently no drift is therefore observed in this case.

Advantageously, the first module of the first structure is electrically connected to the second module of the second structure in order to produce a first sum S1M1+S2M2, and reciprocally the second module of the first structure is electrically connected to the first module of the second structure in order to produce a second sum S1M2+S2M1, and in that one of the two resulting sums is subtracted from the other by an electronic means external to the wafer.

At least one additional interdigitated comb associated with the moving mass could be provided. This comb allows the apparent stiffness of the flexure arms 40, 42, 44, 46 to be electrically adjusted, by simply controlling the DC voltage, this stiffness adjustment having a direct consequence on the adjustment of the natural vibration frequency along Oy in the presence of a Coriolis force. This is because the natural mechanical resonance of the moving assemblies depends on the stiffness of the flexure arms that oppose the vibration movement generated. By adjusting the stiffness, and therefore the frequency, it is possible to compensate for the variations in resonant frequency that might result from non-uniformities or defects in fabrication. Any deviation between the actual frequency and the intended theoretical frequency may thus be compensated for.

With a comb supplied with DC voltage, and acting on the moving mass 30 in order to exert a constant force in the Oy direction, it is possible to exert, at rest, a stress on the flexure arms 40, 42, 44, 46. This stress tends to create a negative stiffness, of electrostatic origin, the absolute value of which is subtracted from the natural stiffness of these arms in the Oy direction.

The comb that could exert this stress is a comb oriented like the other combs (along the general direction of Oy), and in this case it acts by changing the spacing between fingers of the half-combs (a comb with offset fingers). A single central comb may suffice, or else two symmetrical combs placed laterally on either side of the axis 38. The stiffness-adjusting comb comprises a fixed half-comb, an autonomous anchoring region (for an autonomous electrical supply) and a moving half-comb, again consisting of fingers directly cut into the moving mass.

It is also possible to provide another improvement which consists in associating two new combs with the moving mass. These additional combs are intended to exert, by application of suitable DC voltages to each of them, a force that twists the moving mass about its center of symmetry. This has the effect of modifying the orientation of the excitation movement with respect to the detection movement and of consequently modifying (in a direction tending to compensate for it) the quadrature bias of the gyroscope.

The gyroscope bias is the non-zero signal value measured when the angular velocity of rotation of the gyroscope is zero. The quadrature bias results from movements along one axis, whereas a force is in fact exerted on a perpendicular axis. This results from defects in the rectangularity of the beam sections or of other asymmetry factors. This bias may be partly compensated for by exerting a certain torsion on the moving mass. This torsion is exerted for example by acting on two interdigitated combs located diagonally on either side of a center of symmetry of the moving mass 30. A DC voltage is applied to each comb so as to exert a torque in the direction appropriate for compensating for the bias. The torque exists whenever the combs exert forces applied at different points and the directions of which do not pass through the center of symmetry of the mass.

For example, it is possible to provide two combs, in addition to the detection combs 90, 100, 110 and 120 for exerting this torque and the frequency-adjusting combs. However, a single comb would suffice provided that this comb exerts a force in a direction that does not pass through the center of symmetry of the moving mass. It will also be understood that the additional combs, placed diagonally on the moving mass and exerting forces in directions that do not pass through the center of symmetry of the mass, could serve both for adjusting the frequency and for exerting the bias compensating torque. Applying voltages of different amplitude to the additional combs creates both a torque and a resulting upward or downward force, the latter creating the desired negative stiffness. However, for reasons of symmetry and independence of the stiffness control and the torsion control, a configuration with combs specifically for stiffness adjustment and combs specifically for quadrature bias compensation will be preferred.

Finally, another improvement may be provided which consists in associating two new combs with the moving mass, to slave its position on a fixed position which may be that which it occupies when the mass is at rest. In this way, nonlinearities in the measurement delivered by the gyroscope, which appear when the displacement of the moving mass is large, are obviated.

For example, it is possible to provide two combs in addition to the detection combs 90, 100, 110 and 120 which are combs for exerting a restoring force for returning the moving mass to a fixed position. The purpose of the voltage applied to these combs is to compensate for displacement impressed by the movement of the gyroscope—this voltage is calculated from the measurement of the position delivered by the detection combs.

In the foregoing text, provision was made for all the interdigitated combs to be placed in cut-outs in the moving mass, but it would also be possible to envisage them being placed along the edges of the moving mass without modifying the principles which were explained above.

Thus, a microgyroscope has been described that can be easily produced from a silicon wafer in the plane of which were machined both two moving inertial assemblies and a mechanical coupling structure that surrounds them, and in which each moving assembly was produced in the form of two parts, namely a moving mass and a moving frame, the moving frame being connected to the coupling structure via rigid links and the moving mass being connected to the frame, on one side, and to anchoring points, on the other, via flexure arms that allow movement in the plane in only one degree of freedom for the moving mass and in two degrees of freedom for the frame. The two moving assemblies are mechanically coupled both for excitation vibrations and for orthogonal vibrations resulting from the Coriolis force. The mechanical coupling does not take place via flexible flexure arms but directly via rigid links between the moving frame and the coupling structure (unlike in structures in which the coupling between moving assemblies takes place via flexure arms serving both for providing suspension flexibility of the inertial assemblies and the coupling between the two assemblies).

The gyroscope according to the invention may have very high quality factors both in excitation and in detection, thereby allowing the sensitivity of the gyroscope to be increased when identical excitation and detection frequencies are used.

The invention claimed is:

1. A gyroscope with a vibrating structure, produced by micromachining a thin planar wafer, comprising:
two symmetrical moving assemblies that are symmetrical with respect to a central axis parallel to a direction Oy of the plane of the wafer and are coupled by a coupling structure that connects these two assemblies in order to allow mechanical vibration energy to be transferred between them, each of the two symmetrical moving assemblies comprises two moving elements, an inertial first moving element being connected to the coupling structure and able to vibrate in two degrees of freedom in orthogonal directions Ox and Oy of the plane of the wafer, and a second moving element being connected, on one side, to the first element and, on the other side, to fixed anchoring regions via linking means that allow the vibration movement of the first element in the Oy direction to be transmitted to the second element without permitting any movement of the second element in the Ox direction, an excitation structure being associated with the first moving element in order to excite a vibration of the first element along Ox, and a double movement detection structure comprising first and second elementary detection structures being associated with the second moving element of each of the two assemblies in order to detect a vibration of the second elements along Oy, the first moving element being an intermediate frame surrounding the second moving element, denoted by the name moving mass, and the coupling structure comprising two outer frames, each of which surrounds the intermediate frame of a respective moving assembly, wherein each elementary detection structure comprises a first detection module and a second detection module which are symmetrical with respect to an axis of symmetry parallel to the Ox direction, the first detection modules of each elementary structure on the one hand and the second detection modules of each elementary structure on the other hand being symmetrical with respect to the central axis parallel to the Oy direction, the first and second modules of each elementary structure delivering separate detection signals that vary inversely with respect to one another, these being first and second signals S1M1, S1M2 in the case of the first and second modules of the first elementary structure and third and fourth signals S2M1, S2M2 in the case of the first and second modules of the second elementary structure, and means being provided for producing the linear combination S1M1+S2M2−S1M2−S2M1.

2. The gyroscope as claimed in claim 1, wherein the first module of the first elementary structure is electrically connected to the second module of the second elementary structure in order to produce a first sum S1M1+S2M2, and reciprocally the second module of the first elementary structure is electrically connected to the first module of the second elementary structure in order to produce a second sum S1M2+S2M1, and in that means are provided for subtracting the second sum from the first sum.

3. The gyroscope as claimed in claim 1, wherein the excitation structure of the first moving element is a capacitive comb with interdigitated electrodes, said comb being machined in the thin planar wafer.

4. The gyroscope as claimed in claim 1, wherein the detection modules of the elementary detection structure comprise at least one capacitive comb with interdigitated electrodes, said comb being machined in the thin planar wafer.

5. The gyroscope as claimed in claim 1, comprising at least one interdigitated comb associated with each second moving element, in order to exert an adjustable torque on the second moving element.

6. The gyroscope as claimed in claim 1, comprising at least an interdigitated comb associated with each second moving element, in order to adjust the detection frequency.

7. The gyroscope as claimed in claim 1, comprising at least one interdigitated comb associated with each second moving element, in order to slave the position of the second moving element on a position which may be that which the second moving element occupies when it is at rest.

8. The gyroscope as claimed in claim 2, wherein the excitation structure of the first moving element is a capacitive comb with interdigitated electrodes, said comb being machined in the thin planar wafer.

9. The gyroscope as claimed in claim 2, wherein the detection modules of the elementary detection structure comprise at least one capacitive comb with interdigitated electrodes, said comb being machined in the thin planar wafer.

10. The gyroscope as claimed in claim 4, comprising at least one interdigitated comb associated with each second moving element, in order to exert an adjustable torque on the second moving element.

11. The gyroscope as claimed in claim 2, comprising at least an interdigitated comb associated with each second moving element, in order to adjust the detection frequency.

12. The gyroscope as claimed in claim 2, comprising at least one interdigitated comb associated with each second moving element, in order to slave the position of the second moving element on a position which may be that which the second moving element occupies when it is at rest.

13. The gyroscope as claimed in claim 8, wherein the detection modules of the elementary detection structure comprise at least one capacitive comb with interdigitated electrodes, said comb being machined in the thin planar wafer.

14. The gyroscope as claimed in claim 3, comprising at least one interdigitated comb associated with each second moving element, in order to exert an adjustable torque on the second moving element.

15. The gyroscope as claimed in claim 3, comprising at least an interdigitated comb associated with each second moving element, in order to adjust the detection frequency.

16. The gyroscope as claimed in claim 3, comprising at least one interdigitated comb associated with each second moving element, in order to slave the position of the second moving element on a position which may be that which the second moving element occupies when it is at rest.

17. The gyroscope as claimed in claim 4, comprising at least one interdigitated comb associated with each second moving element, in order to slave the position of the second moving element on a position which may be that which the second moving element occupies when it is at rest.

* * * * *